(12) United States Patent
Shkel et al.

(10) Patent No.: US 9,702,728 B2
(45) Date of Patent: Jul. 11, 2017

(54) METHOD OF FABRICATING MICRO-GLASSBLOWN GYROSCOPES

(71) Applicant: The Regents of the University of California, Oakland, CA (US)

(72) Inventors: Andrei M. Shkel, Irvine, CA (US); Doruk Senkal, Irvine, CA (US); Mohammed Ahamed, Toronto (CA)

(73) Assignee: The Regents of the University of California, Oakland, CA (US)

(*) Notice: Subject to any disclaimer, the term of this patent is extended or adjusted under 35 U.S.C. 154(b) by 427 days.

(21) Appl. No.: 14/548,237

(22) Filed: Nov. 19, 2014

(65) Prior Publication Data
US 2017/0016742 A1    Jan. 19, 2017

Related U.S. Application Data

(60) Provisional application No. 61/906,814, filed on Nov. 20, 2013.

(51) Int. Cl.
*G01C 25/00*   (2006.01)
*G01C 19/5691*   (2012.01)

(52) U.S. Cl.
CPC ......... *G01C 25/00* (2013.01); *G01C 19/5691* (2013.01)

(58) Field of Classification Search
CPC ............................ G01C 19/5691; G01C 25/00
IPC ....................................................... G01C 25/00
See application file for complete search history.

(56) References Cited

PUBLICATIONS

Robust Micromachineed Vibratory Gyroscopes, a PhD diisssertation by C. Acar Univ. Calif., Irvine (2004).*
High Performance Micrmachined Vibratory Rate- and Rate-Integratinng Gyroscopes a PhD dissertion by J. Young Cho, The Univ. of Michigan (2012).*

* cited by examiner

*Primary Examiner* — Carl Arbes
(74) *Attorney, Agent, or Firm* — Marcus C. Dawes; Daniel L. Dawes

(57) ABSTRACT

A method of making a Coriolis vibratory gyroscope with a three dimensional mushroom resonator element includes defining a cavity in a substrate wafer; bonding a cap wafer onto the substrate over the cavity from which cap wafer the resonator element will be formed; heating the substrate and cap wafer to generate a pressure build-up within the cavity; plastically deforming the cap wafer by the pressure build-up to form the mushroom resonator element having a perimeter around the mushroom resonator element; releasing the three dimensional mushroom resonator element at the perimeter by selectively removing material so that the perimeter of mushroom resonator element is free to vibrate; and disposing a layer of conductive material on the mushroom resonator element to form electrodes thereon for use in driving and sensing vibrations of the mushroom resonator element and its perimeter. A microgyroscope made by such a method is also included within the embodiments.

22 Claims, 12 Drawing Sheets

— Drive 1 (+)
- - - Drive 1 (-)
— Drive 2 (+)
- - - - - Drive 2 (-)

— Drive 1
— Drive 2

METHOD OF FABRICATING MICRO-GLASSBLOWN GYROSCOPES

CROSS-REFERENCE TO RELATED APPLICATIONS

This application claims priority to, and the benefit of the earlier filing date of: U.S. provisional patent application entitled Micro-Glass Blown Gyroscopes, filed on Nov. 20, 2013, Ser. No. 61/906,814, pursuant to 35 USC 119; and the contents of which is incorporated herein by reference.

GOVERNMENT SUPPORT

This invention was made with Government support under Grant No. W31P4Q-11-1-0006 awarded by the Defense Advanced Research Projects Agency. The Government has certain rights in this invention.

BACKGROUND

Field of the Technology

The disclosure relates to the field of microgyroscopes and their fabrication.

Description of the Prior Art

Motivated by the proven performance of macro-scale hemispherical resonator gyroscopes (HRG), there has been a growing interest in three dimensional microelectrochemical machined (MEMS) wineglass resonator architectures for use in timing and inertial sensing applications. For example, devices such as rate integrating gyroscopes and mode-matched angular rate gyroscopes rely heavily on the stiffness ($\Delta f$) and damping ($\Delta \tau$) symmetry for high performance operation. Wineglass architectures may enable MEMS-scale integration of these applications due to potential advantages in symmetry, minimization of energy losses and immunity to external vibrations. However, a standalone resonator is insufficient to operate as a gyroscope. Some kind of integrated electrostatic transduction is necessary.

Previously, we demonstrated in-situ electrode structures on MEMS borosilicate glass hemispherical resonators for electrostatic transduction. In these devices, borosilicate glass resonators were fabricated using deep glass etching and XeF2 release of silicon. Characterization using in-situ electrode structures revealed a sub-Hz frequency split on one device and <5 Hz frequency split on multiple devices. Despite the extremely high structural symmetry, the Q-factors were limited to several thousands due to the high impurity content of borosilicate glass and the associated internal dissipation. Because of this reason, research continued on micro-glassblowing of fused silica wineglass resonators.

Fused silica is a desired resonator material due to low amount of impurities within the material and due to its low internal thermo-elastic dissipation, which is required for a high quality factor resonator. A high Q-factor is desired in MEMS vibratory resonators, rate gyroscopes, RF filters, and clocks. Current MEMS fabrication techniques limit the maximum achievable Q-factor by restricting the material choice to few materials and device geometry to two dimensional planar structures. Available materials such as single-crystal silicon have relatively high thermoelastic dissipation and two dimensional planar devices are mostly limited by anchor losses. To take full advantage of the three dimensional wineglass architecture,fabrication techniques with low surface roughness as well as materials with high isotropy and low thermoelastic dissipation (TED) are desired, We have previously demonstrated stand-alone fused silica glassblown three dimensional resonator structures, however the shells were not released or releasable from the substrate and as a result could not be utilized for resonator or gyroscope operation. It was also missing a transduction mechanism, namely sensing and actuation electrodes to able to operate as a gyro. Integrated sensing and actuation is required for gyro operation.

Wafer-scale fabrication of smooth, symmetric and high aspect ratio three dimensional structures through micro-machining processes remains to be a challenge. This is mainly due to low relative tolerances and low aspect ratios (2.5-D) associated with conventional micro-machining processes Factors such as mold non-uniformity, alignment errors or high surface roughness and granularity of deposited thin films have so far prevented the integration of three dimensional wineglass structures with MEMS techniques. For example hemispherical shells were fabricated by thermally growing oxide in isotropically etched cavities with the lowest as-fabricated frequency split reported at 94 Hz. Diamond hemispherical shells were also fabricated, using micro-crystalline diamond deposition into hemi-spherical molds, a frequency split of ~770 Hz was reported at ~35 kHz center frequency. A similar process based on deposition of silicon nitride thin films and isotropic etching of silicon has also been explored and a minimum etch non-uniformity of 1.4% was observed inside the molds due to the crystalline orientation dependent preferential etching in silicon. This effect may be a contributing factor in frequency asymmetry previously observed.

Alternative fabrication techniques include thin film deposition onto high-precision ball bearings blow-molding of bulk metallic glasses, or blow-torch molding of fused silica. Q-factors as high as ~300,000 were observed on blow-torch molded devices, however relative frequency splits ($\Delta f_n=2/f_n=2$) were on the order of 0.24~% to 4.49% A ~2× variation in central frequency was also observed, which was associated with variations in molding duration and the consequent thickness variation.

BRIEF SUMMARY

What we have provided is an improved high Q-factor fused silica micro-hemispherical resonator with integrated out of plane electrodes for actuation, control and sensing. It is a fully released fused silica inverted wineglass structure with several orders of magnitude improvement in Q-factor, An out of plane electrode architecture is also presented, with potential advantages in robustness to alignment errors, minimum obtainable capacitive gap and compatibility with batch-level fabrication.

What is disclosed is a fabrication approach for batch-scale fabrication of inverted-wineglass (or mushroom) resonators and gyroscopes. Previously fused silica hemi-spherical resonator gyroscopes were demonstrated on a macro-scale. These gyroscopes were fabricated one at a time through precision machining processes, have large size (diameter above 20 mm) and are extremely costly (upwards of $50,000 per gyroscope). The disclosure focuses on fabrication of fused silica gyroscopes on a wafer level through a micro-glassblowing based fabrication process. By using this process hundreds of micro-scale fused silica (or other material) three dimensional gyroscopes can be fabricated on a wafer surface simultaneously and at a very low cost. In addition, the gyroscopes have an extremely small size (several mm) and high performance, which makes them attractive for mobile navigation applications.

A three dimensional Coriolis vibratory gyroscope fabrication and its transduction method is presented. Based on macro-scale hemispherical resonators, there is a growing interest in three dimensional MEMS wineglass resonators for high performance gyroscope, timing, signal processing and inertial sensing applications due to potential advantages in terms of symmetry, minimization of energy loss and immunity to external vibrations. However, MEMS hemispherical resonators with efficient transduction for gyroscopes have so far not been realized. Efficiency of transduction of electrostatic pick-off is directly proportional to vibrational velocity and in turn to maximum displacement. For this reason, it is important to have large enough displacement across the capacitive gaps as to fully utilize the available gap. In plane transduction with in-situ electrodes and out of plane electrodes are utilized for the three dimensional motion of the shell structure to operate it as a Coriolis gyroscope. A batch wafer-level fabrication method is developed.

The disclosed design is marked by its capability of batch fabrication and its transduction methods. The fabrication involves micro-glassblowing and releasing three dimensional micro-hemispherical' resonators made out of high Q materials such as fused silica and ultralow expansion titanic silicate glass (ULE). The out-of-plane transduction which utilizes radial motion along the wineglass perimeter has an out of plane component. In this approach, electrodes are placed on a planar surface, as a result significantly smaller capacitive gaps are possible. Other advantages include lower cost, robustness to alignment errors and the compatibility with batch-scale fabrication.

A wafer-level fabrication process was developed for fused silica and ULE micro-glass blown three dimensional wineglass gyroscopes. Out of plane electrodes were implemented for out of plane transduction. The fabrication process and the proposed actuation scheme was successfully demonstrated for a micro-glass blown device with a demonstrated high Q-factor of >85K on a 3.5 mm diameter device.

The illustrated embodiments include a method of making a Coriolis vibratory gyroscope with a three dimensional mushroom resonator element including the steps of: defining a cavity in a substrate wafer; bonding a cap wafer onto the substrate over the cavity from which cap wafer the mushroom resonator element is or will be formed; heating the substrate and cap wafer to generate a pressure build-up within the cavity; plastically deforming the cap wafer by the pressure build-up to form the mushroom resonator element having a perimeter around the mushroom resonator element; releasing the three dimensional mushroom resonator element at the perimeter by selectively removing material so that the perimeter of mushroom resonator element is free to vibrate; and disposing a layer of conductive material on the mushroom resonator element to form electrodes thereon for use in driving and sensing vibrations of the mushroom resonator element and its perimeter. Both in-plane and out-of-plane electrode structures can be fabricated in combination with the mushroom resonator element using this method. Throughout this specification the resonator will be referenced as a "mushroom resonator element", but it is also equivalently referenced or called a wineglass resonator element.

The step of releasing the three dimensional mushroom resonator element includes etching a circular trench into the substrate wafer underneath the perimeter of the resonator element to release the three dimensional mushroom resonator at the perimeter.

The step of etching the circular trench includes etching the circular trench when cap wafer is still planar before plastically deforming the cap wafer into the three dimensional mushroom resonator element.

The step of etching the circular trench includes etching the circular trench is etched after plastically deforming the cap wafer into the three dimensional mushroom resonator element.

The substrate wafer has a backside opposing the mushroom resonator element and the step of releasing the three dimensional mushroom resonator element includes releasing the three dimensional mushroom resonator element at the perimeter by lapping the substrate wafer from the backside.

The step of releasing the three dimensional mushroom resonator element includes releasing the three dimensional mushroom resonator element at the perimeter by plasma etching.

The step of releasing the three dimensional mushroom resonator element includes releasing the three dimensional mushroom resonator element at the perimeter by wet chemical etching.

The step of releasing the three dimensional mushroom resonator element includes releasing the three dimensional mushroom resonator element at the perimeter by dry chemical etching.

The step of releasing the three dimensional mushroom resonator element includes releasing the three dimensional mushroom resonator element at the perimeter by ultrasonic machining.

The step of releasing the three dimensional mushroom resonator element includes releasing the three dimensional mushroom resonator element at the perimeter by abrasive jet machining.

The step of releasing the three dimensional mushroom resonator element includes releasing the three dimensional mushroom resonator element at the perimeter by milling.

The step of releasing the three dimensional mushroom resonator element includes releasing the three dimensional mushroom resonator element at the perimeter by directional plasma etching along the perimeter followed by isotropic dry etching of the substrate wafer underneath the perimeter.

The step of disposing the layer of conductive material on the mushroom resonator element to form electrodes thereon includes forming out-of-plane electrodes for electrostatic transduction by removing the substrate wafer, disposing conductive electrodes on a base wafer, disposing a sacrificial layer on the conductive electrodes and base wafer, bonding the sacrificial layer with the released mushroom resonator element, and removing the sacrificial layer to create an out of plane capacitive gap between the mushroom resonator element and the conductive electrodes on the base wafer.

The step of disposing conductive electrodes on a base wafer includes blanket disposing a conductive layer onto the base wafer and selectively removing portions of the conductive layer to define electrodes.

The step of disposing conductive electrodes on a base wafer includes disposing doped silicon, diamond or metal.

The step of disposing a sacrificial layer on the conductive electrodes and base wafer includes disposing a sacrificial layer of a selected thickness to define the distance of the out of plane capacitive gap.

The step of disposing a sacrificial layer on the conductive electrodes and base wafer includes the disposing a shim between the mushroom resonator element and the electrode on the base wafer, bonding the base wafer to the mushroom resonator element, and removing the shim.

The step of disposing a layer of conductive material on the mushroom resonator element includes forming in-plane electrodes for electrostatic transduction by selectively removing portions f the substrate wager at the perimeter of the three dimensional mushroom element and between individual electrodes to define a capacitive gap.

The step of forming in-plane electrodes for electrostatic transduction the capacitive gaps for individual electrodes includes forming the in-plane electrodes before plastically deforming the cap wafer, then releasing the three dimensional mushroom resonator element at the perimeter.

The step of disposing a layer of conductive material on the mushroom resonator element to form electrodes is performed after plastically deforming the cap wafer by the pressure build-up to form the mushroom resonator element, The step of disposing a layer of conductive material on the mushroom resonator element to form electrodes includes forming a plurality of flat electrodes underneath the perimeter of the three dimensional mushroom resonator element to define out of plane capacitive gaps.

The step of disposing a layer of conductive material on the mushroom resonator element to form electrodes includes forming a plurality of radial electrodes underneath the perimeter of the three dimensional mushroom resonator element to define in-plane capacitive gaps.

The illustrated embodiments also include a microgyroscope made by any one of the foregoing methods.

While the apparatus and method has or will be described for the sake of grammatical fluidity with functional explanations, it is to be expressly understood that the claims, unless expressly formulated under 35 USC 112, are to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

Figure 1A:
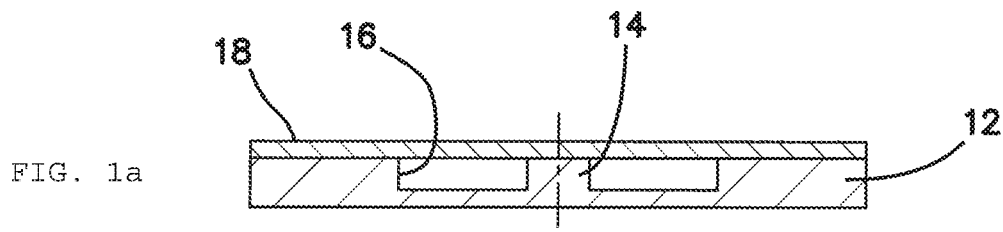
FIGS. 1a-1e are diagrammatic side cross sectional views of the process wherein a mushroom resonator element is micro-glass blown in a wafer level batch process.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

Maximization of the quality Q-factor and structural symmetry is key to enhancing the performance of vibratory MEMS devices in demanding signal processing, timing and inertial applications. For example, timing devices rely heavily on high Q-factors for low close-to-carrier phase noise and low energy consumption. Whereas devices such as rate integrating gyroscopes and mode-matched angular rate gyroscopes rely heavily on long energy decay times (Q-factor or $\tau$) as well as the stiffness ($\Delta f$) and damping ($\tau$) symmetry for high performance operation.

The macro-scale hemispherical resonator gyroscope (HRG) with Q-factors over 25 million motivates the investigation of three dimensional fused quartz micro-wineglass structures for use as vibratory elements for use in MEMS timing and inertial sensing applications. Wafer-level fabrication of the wineglass architecture may enable new classes of MEMS devices due to potential advantages of the wineglass geometry in symmetry, minimization of energy losses and immunity to external vibrations.

In addition current MEMS fabrication techniques limit the maximum achievable Q-factor by restricting the material choice to a few materials. Available materials such as single-crystal silicon have relatively high coefficient of thermal expansion (CTE) and consequently high thermoelastic dissipation (TED). Materials with low CTE, such as fused quartz (0.5 ppm/° C.) and ultralow expansion titania silicate glass (ULE TSG, 0.03 ppm/° C.) can provide a dramatic increase in fundamental QTED limit (QTED>7E+10 for a titania silicate glass (TSG) wineglass structure). However, when compared to silicon, titania silicate glass and fused quartz dry etching suffers from an order of magnitude higher surface roughness, lower mask selectivity (~1:1 for KMPR®) and lower aspect ratio, <5:1.

We explore the micro-glassblowing paradigm as an alternative fabrication technique for wafer-level fabrication of fused quartz and titania silicate three dimensional MEMS wineglass structures. Micro-glassblowing process relies on surface tension and pressure driven deformation of the device layer to define the three dimensional shell structure as opposed to conventional deposition, molding or etching techniques. Surface tension forces act on the three dimensional shell structure at an atomic level to minimize surface roughness and structural imperfections. This may lead to levels of smoothness and structural symmetry that is not available through conventional fabrication techniques. In addition micro-glassblowing of low thermal expansion materials such as fused quartz and titania silicate glass (TSG) can enable MEMS resonant devices with intrinsically low internal losses (QTED).

However, three dimensional shell micro-wineglass fabrication alone is insufficient, to be able to operate it as a gyroscope it needs electrostatic actuation and sensing. For this reason we developed a wafer-level fabrication method for integrated electrodes.

The illustrated embodiment includes two different actuation methods, the first method includes out-of-plane electrodes and second method includes in-plane electrodes.

Consider first, macro-scale hemispherical resonator gyroscopes. The highest performance macro-scale solid state gyroscope is the hemi spherical resonator gyro (HRG) that has been under development since 1975 by various organizations such as Draper Labs, Delco, Litton and the current developer Northrop Grumman. The gyroscope went through many design iterations over the years, however the extremely high performance of the HRG has always been associated with the precision machined fused silica wineglass resonator that constitutes the heart of the gyroscope. Due to the extremely high Q-factors provided by the fused silica resonator of over 25 million, HRG demonstrates exceptional bias stability (0.000080°/hr) and noise performance (0.000010°/√(hr)). However the gyroscope is primarily used for aerospace applications due to extremely high cost ($50,000-100,000 per axis) and relatively large size >30 mm. Despite the current development efforts to further reduce the size of the gyroscope, cost and size remains a prohibiting factor for large-scale integration. The typical electrostatic actuation and pick-off from HRG is carried out by pick-off and actuation electrodes that surrounds the shell. In such a design, the three dimensional hemispherical wineglass shell is in the middle which is surrounded by the plurality of sense and drive electrodes (typically eight or more electrodes). The challenging aspect of this approach is complexity in fabrication to maintain high tolerance in the small gap between the surrounding electrodes and the shell. The illustrated approach of the present disclosure by-passes this problem by not using a conformal design.

Another HRG has been developed and commercialized by French SAGEM. Again the gyroscope employs a precision machined fused silica resonator at its core, but this time a bell type resonator is used with an internal stem structure. Another major difference from the Northrop Grumman HRG are planar electrode structures that lowers the fabrication cost associated with outer electrode fabrication in exchange for lower total capacitance.

The design involves a macro-scale bell resonator connected to a base by a rod which hosts the planar electrodes. The resonator inner core is metalized which serves as an electrode, a plurality of shielding ground electrodes in the middle, an array of main electrodes radially distributed, and array of auxiliary electrodes, which are again radially distributed. The main electrodes are located around the edges to detect motion. The challenging aspect in this process is the fabrication of the bell resonator and the electrodes on a macro-scale using precision machining techniques, which is not wafer level and the integration is complex increasing the total cost. In our design the fabrication of the hemispherical shell is accomplished through a MEMS based micro-glassblowing technique, which reduces cost and allows fabrication of hundreds (or thousands) of gyroscopes simultaneously on the surface of a single wafer.

Turn now to the illustrated micro-scale hemispherical resonator gyroscopes. Fused silica blow torch molding was demonstrated to create bird-bath (hemitoroidal) and hemi-spherical shell structures. To create the fused silica shells, thin layers of fused silica were pressed onto graphite molds under vacuum and deformed to take the shape using the heat from a blow torch. Shell structures were later lapped from the back-side to release the devices around their perimeter. Finally, the shells were sputter coated with thin layer of Ti/Au for conductivity. Ring-down testing under 1 mTorr vacuum revealed Q-factors as high as ~300000. Relative frequency split ($\Delta fn=2/fn=2$) ranged between 0.24% and 4.49% with a mean value at around 1-1.5% (100-150 Hz). High frequency split was attributed to the alignment between the blow-torch and the mold as well as temperature non-uniformity.

The transduction method has surrounding electrodes along the perimeter of the resonator, however the fabrication process is not at wafer level. The integration involves a complex assembly and maintaining capacitive gaps is difficult, making the overall gyroscope fabrication not suitable for mass production.

Isotropic wet etching of silicon molds using $HF-HNO_3$ and silicon nitride molds have previously been investigated. The purpose of the molds was to deposit a thin film material (i.e. silicon nitride) into the mold at a later step to create hemi-spherical shell structures. Different HF and $HNO_3$ ratios as well as different silicon orientations (<100> and <111> wafers) were experimented with. The results were also compared to dry $XeF_2$ etching of silicon, which resulted in significantly poorer etch roughness compared to wet etching using HF and $HNO_3$. The mold isotropy was investigated using optical profilometry. Due to the crystalline nature of silicon, high etch anisotropy was observed. The hemi-spherical molds were deformed towards a square shape for <100> silicon and towards a hexagonal shape for <111> silicon Lowest an-isotropy of 1.4% was obtained for <111> silicon wafers using higher $HF:HNO_3$ ratios.

Hemi-spherical shell structures were fabricated by thermally growing $SiO_2$ inside isotropically etched silicon cavities and later removing the silicon mold using $XeF_2$ etching. As opposed to wet etching, the molds in this work were created using a dry etching process (SF6 plasma etching). The shell structures had a diameter of 1105 μm and a radial deviation of 3.37 μm along the perimeter. Hemi-spherical shell structures were later coated with TiN using atomic layer deposition (ALD) for electrostatic conductivity. Electrostatic testing revealed a resonant mode with a Q-factor of ~6000 at 113 kHz. Similar structures were later fabricated out of polysilicon by using the $SiO_2$ layer inside the mold cavity as a sacrificial layer and depositing polysilicon on top to create the device layer. A Q-factor of ~8000 was observed at 421 kHz for these structures. Both the oxide and the polysilicon hemi-spherical shells lacked a stem structure, an essential component in HRGs for the purpose of anchor loss reduction. Later, the fabrication effect of thickness anisotropy on oxide micro-hemispherical shell resonators was analyzed using finite element analysis (FEA). Apparent thickness anisotropy was associated to different oxide growth rates at different crystalline planes of the silicon wafer. Modeling results showed that <1 Hz frequency split ($\Delta f$) is achievable using the fabrication process described. However experimental results showed a frequency split of ~94 Hz, a stark 5 orders of magnitude difference from modeled frequency split.

Poly-crystalline diamond hemi-spherical shell structures were fabricated by depositing poly-diamond thin films into hemi-spherical molds on a silicon wafer. However, instead of wet/dry etching as in previous methods, the hemi-spherical molds were created by μ-EDM (electro discharge machining). The EDM process creates extremely rough surfaces so HNA (HF, nitric acid, acetic acid) wet etching was used at a later step to smooth the mold surface. A piezo-electric shaker was used to excite the diamond hemi-spherical shell structures. Frequency sweeps using this method revealed a Q-factor of ~3000 at ~35 kHz. A frequency split ($\Delta f$) of ~1 kHz was observed between two degenerate n=2 wineglass modes (5% relative split). The low Q-factor and the large frequency asymmetry was associated with the absence of a stem structure and the roughness at the rim of the shell structures. One advantage of this particular fabrication process over other thin-film shell structures is that the poly-crystalline diamond films can be doped with boron, creating inherently conductive shell structures, bypassing the need for an additional metal layer.

Another stemless $SiO_2$ hemi-spherical shell fabrication process which relies on isotropically etched hemi-spherical molds on a silicon wafer. Thermally grown $SiO_2$ was used as an etch stop layer along with a poly-silicon sacrificial layer underneath the oxide shells. Aluminum electrodes were patterned on the wafer surface for electrostatic driving and sense using capacitive fringe fields. Piezo shakers and electrostatic drive using a probe tip was used for the actual testing with laser Doppler vibrometry pick-off. Resonant peaks were observed during frequency sweeps, however the lack of phase information makes it challenging to identify the actual mechanical resonant modes or system parameters such as Q-factor and frequency split ($\Delta f$). We have reported Q-factors up to 22000 and frequency split as low as 5 Hz despite the apparent lack of phase information.

Thin film sputtered ULE (Ultra Low Expansion Glass) shells have been fabricated using a process called 'Poached-Egg Micro-molding'. As opposed to using hemi-spherical molds on a silicon wafers, precision ball lenses were utilized as a mold. The ball lenses were coated with a poly-silicon sacrificial layer followed by sputtering of ULE glass as the device layer. The coated ball lenses were placed onto silicon posts and the ULE above the equator line of the lens a as etched using Ar plasma etching. Later the ball lens was removed by $XeF_2$ of the poly-silicon device layer, leaving a sputtered ULE shell structure in the shape of the ball lens. Piezo shakers were used along with optical fiber pick-off to obtain frequency sweeps, a resonant peak at ~17.3 kHz was observed with a Q-factor of approximately 20000. We have reported better than 120 ppm thickness uniformity and less than ±125 μm deviation from a perfect sphere.

A micro-machining processes that utilizes ultrasonic machining (USM), electrodischarge machining (EDM) and lapping have also been proposed. EDM was mainly used to shape the stainless steel tooling, which was then used to USM fused quartz spheres. Fused quartz spherical-concave and mushroom type structures were created using this process. A tool wear less than 5% was observed Resonance characteristics were investigated using a piezo shaker and laser Doppler vibrometry. A Q-factor of 345 was observed at 1.38 MHz in air. We have proposed the method of attachment (adhesive polymer) as the main loss mechanism limiting the Q-factor.

Macro-scale hemispherical resonator gyroscopes (diameter>20 mm) typically utilize inner and outer electrode structures that are conformal to the three dimensional shell structure. Each electrode assembly typically contains anywhere between 8 to 32 (or higher) discrete electrodes, these electrodes can be used for various control functions such as forcer, pickoff, parametric drive, quadrature suppression etc. Due to the necessity of small capacitive gaps for efficient transduction and the three dimensional nature of the shell structure, conformal electrode structures have very strict fabrication tolerances and high cost. The current state of the art is not batch wafer level fabrication compatible. We have developed and successfully demonstrated a fabrication process for micro-glassblown wineglass gyroscopes with in-plane as well as out-of-plane transduction.

Wafer Level Fabrication of Coriolis Vibratory Gyroscope with In-Situ Transduction The disclosed fabrication process was optimized with two design goals in mind: (1) batch-scale compatible fabrication process, (2) elimination of process steps that can contribute to frequency asymmetry. For compatibility with batch-scale fabrication, only standard MEMS processes were used in fabrication of the micro-wineglass resonators: the process includes two lithography steps, three dry etch steps, one electroplating, and one sputtering step. The glassblowing is performed in a standard rapid thermal annealing system, which can provide uniform heating and cooling for up to 6" diameter wafers (Heatpulse 610 RTA).

We have found that edge defects and thermal/mechanical perturbations during glassblowing are the primary factors affecting the frequency symmetry of micro-glassblown resonators 10. These effects were eliminated by using an improved dry-etch mask and optimizing the glassblowing conditions to have uniform temperature and gas flow. In order to minimize the frequency asymmetry further, additional precautions were taken. Pick-and-place or wafer alignment steps that can create misalignment and potentially contribute to frequency asymmetry were eliminated. Contribution of mask misalignment errors were also minimized by incorporating only two lithography steps and using a self-aligned stem structure. Both of the lithography steps were performed before the micro-glassblowing step, while the device layer is still two dimensional, as described below in FIG. 1(*b*). This eliminates the need for more challenging patterning techniques such as three dimensional lithography, shadow masks or laser ablation of the three dimensional structure. Finally, anisotropic dry etching was used to define both the substrate cavity and the outer perimeter of the structure, eliminating etch asymmetries that may occur due to crystalline orientation of silicon.

Consider now fabrication of a micro-glass blown wineglass gyroscope with in-plane electrodes. In order to fabricate micro-wineglass resonators 10, first cylindrical cavities 16 with a central post 14 were etched to 250 µm depth on a 4" silicon substrate wafer 12 using DRIE as seen in FIG. 1(a). Then, a thin glass layer 18 (100 µm) was anodically bonded onto the silicon substrate 12. Anodic bonding was performed using a DC voltage of 600 V and a load of 100 N at 400° C. The glass layer 18 was bonded to the substrate 12 along the perimeter of the cylindrical cavity 16 and at the central post 14, hermetically sealing atmospheric pressure air within the cavities 16.

Figure 1B:
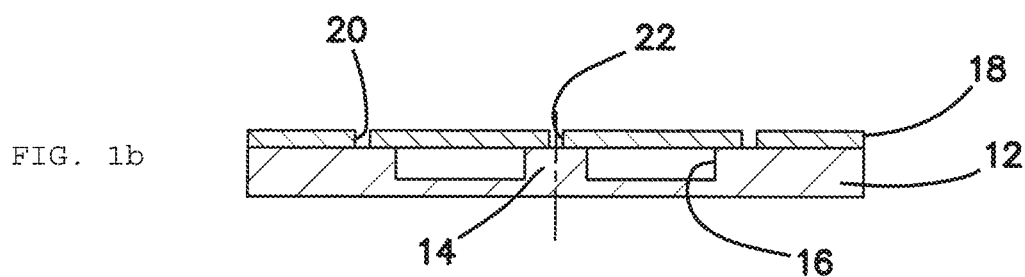

This was followed by deep glass dry etching to define the outer perimeter 20 of the wineglass resonator 10 and central via hole 22 as shown in FIG. 1(b). Capacitive gaps and individual electrodes (not shown) as well as the central via hole 22 were defined at this step. The glass etching was performed using a magnetic neutral loop discharge plasma oxide etcher (ULVAC NLD 570 Oxide Etcher). A ~5 µm thick low-stress electroplated Cr/Ni hard-mask was used to etch the 100 µm deep trenches.

Figure 1C:
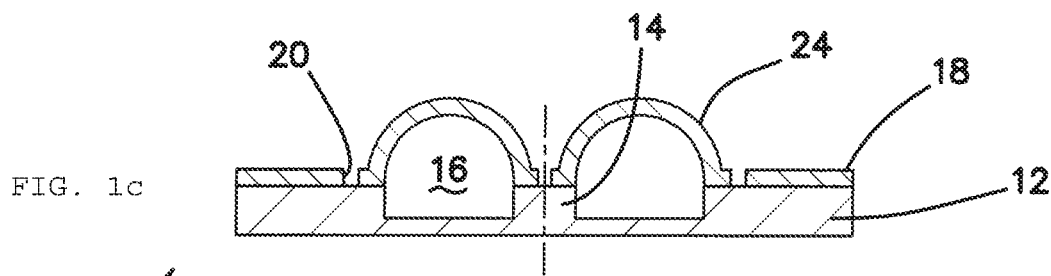

This was followed by micro-glassblowing of the wafer stack at 875° C. inside a RTA system where the glass layer 18 becomes viscous and the air inside the cavity 16 expands, creating a three dimensional shell structure 24 shown in FIG. 1(c). Once the three dimensional micro-glass blown structure 24 forms, the wafer 26 was rapidly cooled to root temperature for solidification. During the micro-glass blowing step, the perimeter 20 of the wineglass structure and the planar electrodes (not shown) do not deform as there is no etched cavity under these structures, enabling lithographic definition of the capacitive gaps.

Figure 1D:
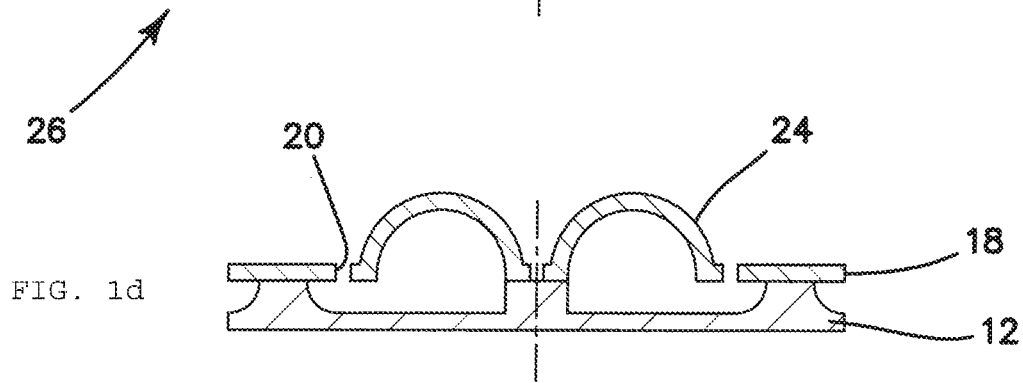
Figure 1E:
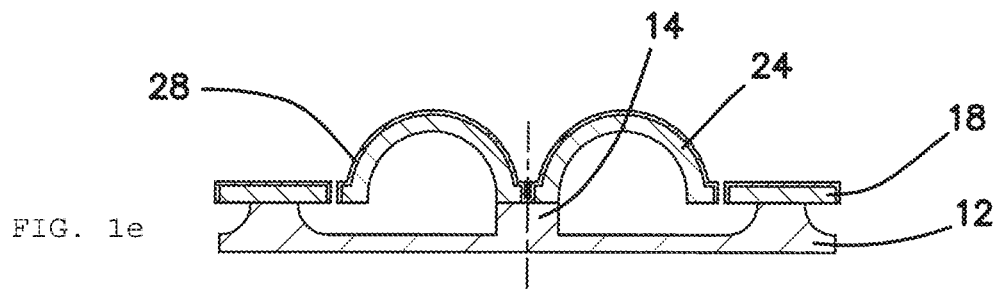
Figure 2:
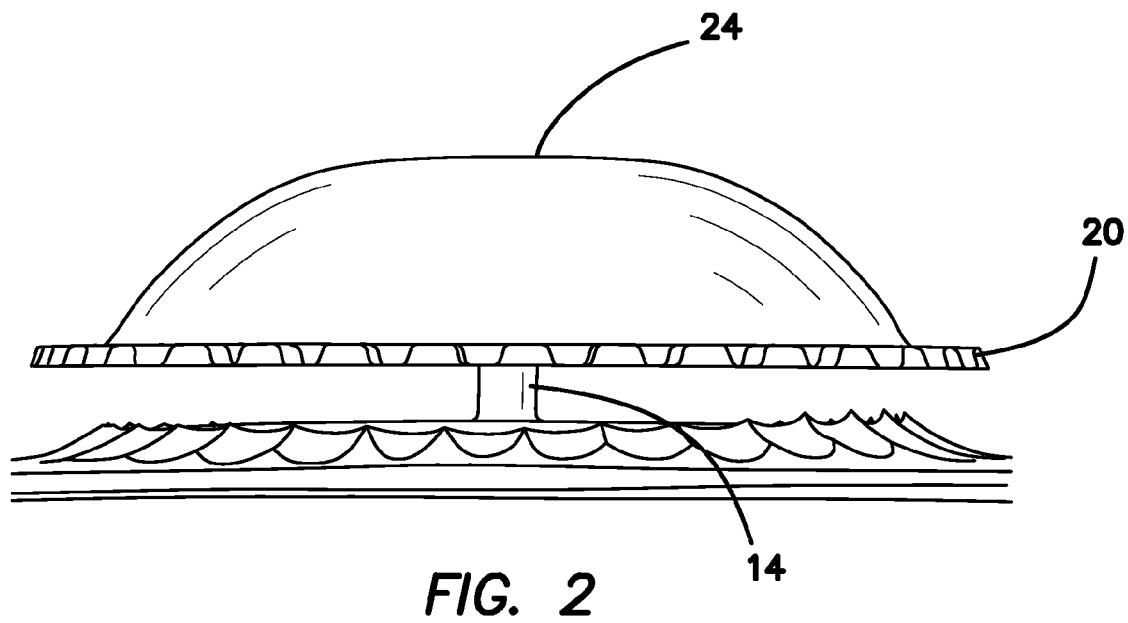
FIG. 2 is an enlargement of a side view microphotograph of the mushroom resonator element of FIGS. 1a-1e shown as released from the substrate wafer.

The next step was $XeF_2$ etching of the substrate underneath the glass layer 18 in order to release the wineglass resonator 10 along its perimeter 20 as shown in FIG. 1(d). $XeF_2$ was chosen because of the extremely high glass-to-silicon selectivity (as high as 1:1000 selectivity). Once the etch was complete, a free standing micro-wineglass structure 10 with a self-aligned stem structure 28 is obtained as shown in FIG. 2.

Figure 3:
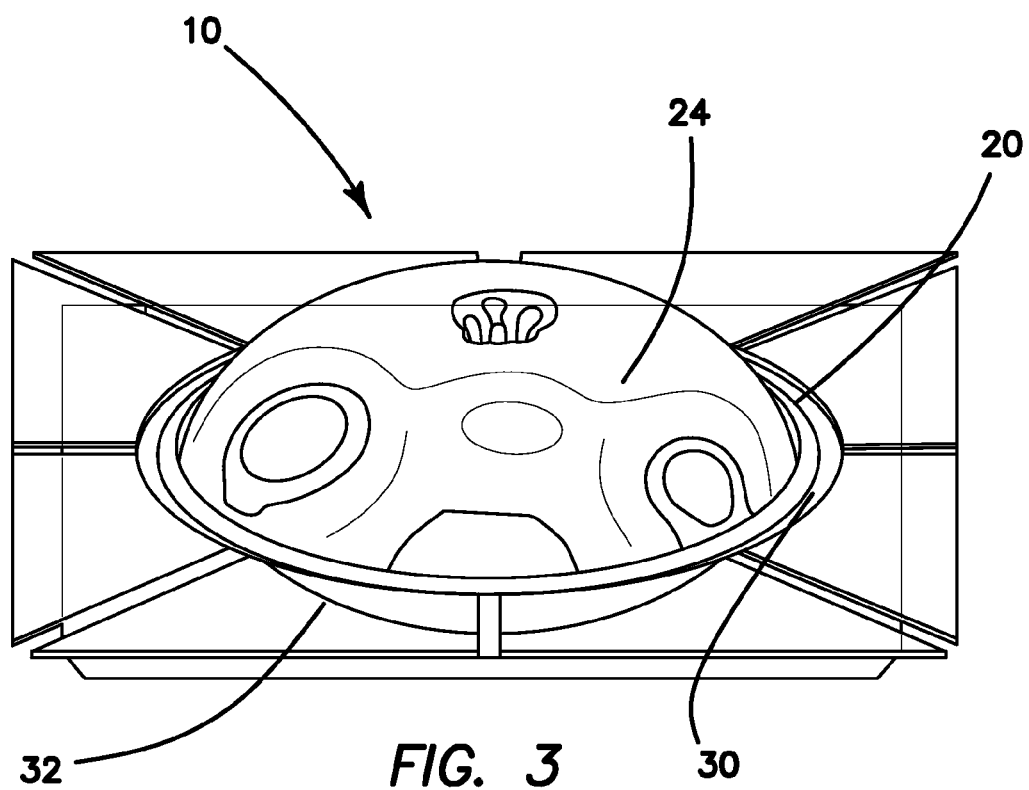
FIG. 3 is a perspective view microphotograph of the mushroom resonator element of FIGS. 1a-1e after the metallization of the mushroom resonator element and formation of the in-plane electrodes.
Figure 4:
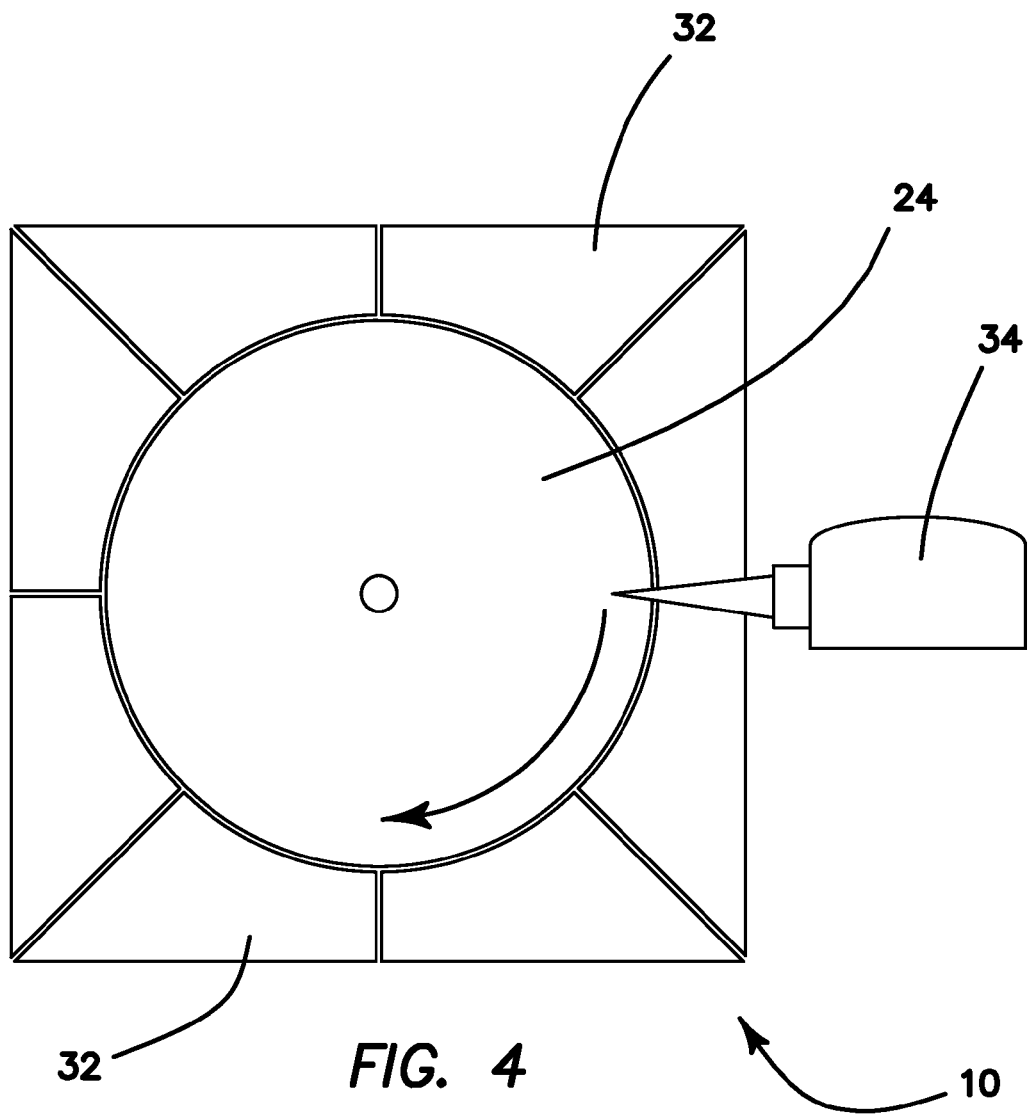
FIG. 4 is a diagram showing one embodiment of an electrode configuration and testing of the symmetry of the mushroom resonator element.
Figure 5A:
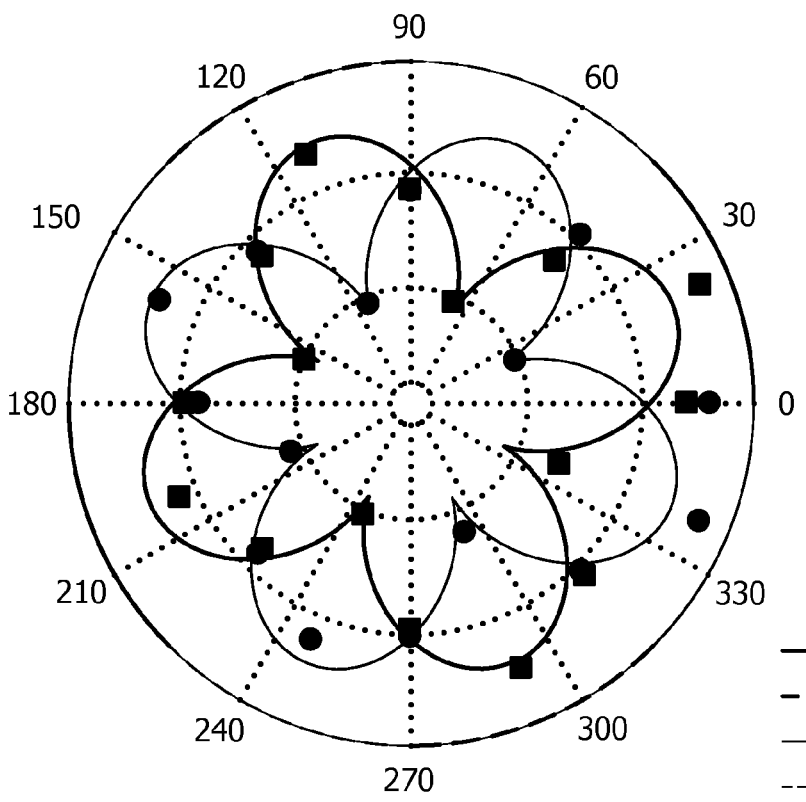
FIGS. 5a and 5b are diagrams illustrating examples of two degenerate vibration modes of one embodiment of the mushroom resonator element.
Figure 5B:
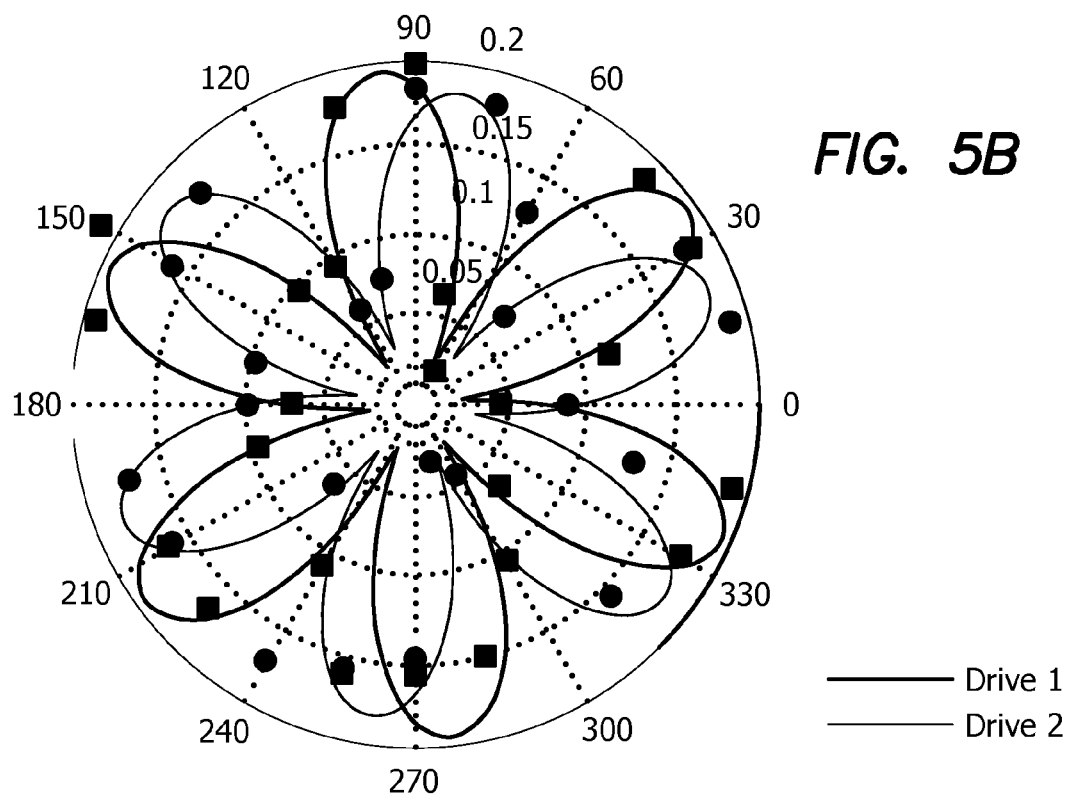

The final step of the fabrication process is blanket metallization by sputtering shown in FIG. 1(d) in diagrammatic side cross sectional view and in three dimensional perspective view in FIG. 3 where a 30 nm sputtered Iridium layer 28 was chosen for the metal layer 28, because of high conductivity, corrosion resistance and the ability to apply without utilizing an adhesion layer (such as Cr or Ti). The metal layer 28 coats the top surface of the resonator shell 24, the side walls of the capacitive gaps 30 as well as inside of the central via hole 22. However, directionality of the sputtering process prevents the metal layer 28 from coating the undercut created by the $XeF_2$ etch, electrostatically isolating the electrodes 32 and the resonator 10 as depicted FIG. 1(e). Electrostatic feed-through to the resonator 10 was obtained through the central via structure using via hole 22, which connects the resonator 10 to the substrate Testing & Characterization of In-Situ Transduction In order to experimentally identify the mode shapes associated with different resonant frequencies, the wineglass resonator 10 was excited electrostatically using the integrated electrode structures 32. The amplitude of motion at different points along the outer perimeter 20 was mapped using laser Doppler vibrometry 34 (LDV), creating a representation of the mode-shapes associated with different resonant frequencies as diagrammatically depicted in FIG. 4. This was accomplished by moving the laser spot along the perimeter while driving the resonator 10 with two different sets of electrode configurations for each degenerate wineglass mode. For n=2 wineglass mode, 4 electrodes were used for each degenerate mode with 45° angle between the two electrode sets as shown in FIG. 5a. Two of the electrodes were driven in anti-phase, this electrode configuration excites the n=2 wineglass mode selectively, while suppressing all other modes. For n=3 mode, a single electrode was used for each degenerate wineglass mode. Excitation using a single electrode was necessary, as a balanced excitation using 2 or 4 electrodes inherently suppresses the n=3 mode as shown in FIG. 5b. A DC bias voltage of 100 V and an AC drive voltage of 5 V was used in all experiments (VDC=100 V and VAC=5 V) Large drive voltages used in this experiment were due to large capacitive gaps of the current prototypes (>30_m).

Figure 7:
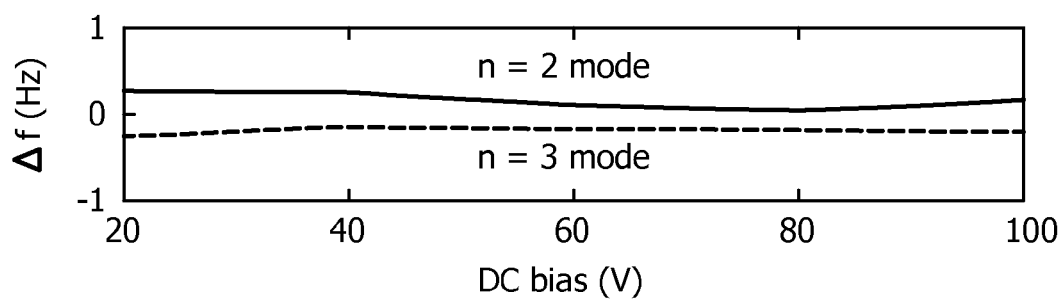
FIG. 7 is a graph of the frequency split between degenerate modes of FIGS. 6a and 6b as a function of DC bias to estimate the contribution of electrostatic spring softening effect on the device.
Figure 6A:
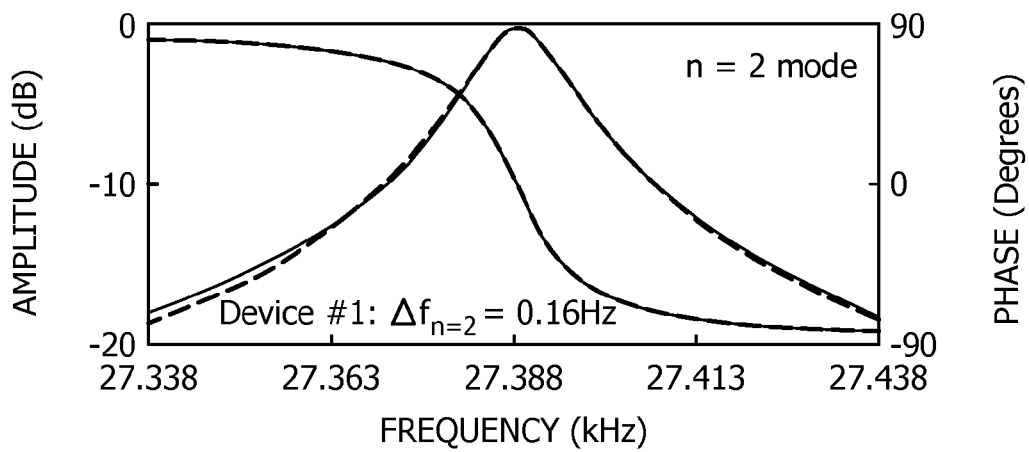
FIGS. 6a and 6b are graphs showing the center frequencies of degenerate wineglass modes identified at 27389 Hz and 64583 Hz for n=2 and n=3 wineglass modes respectively.
Figure 6B:
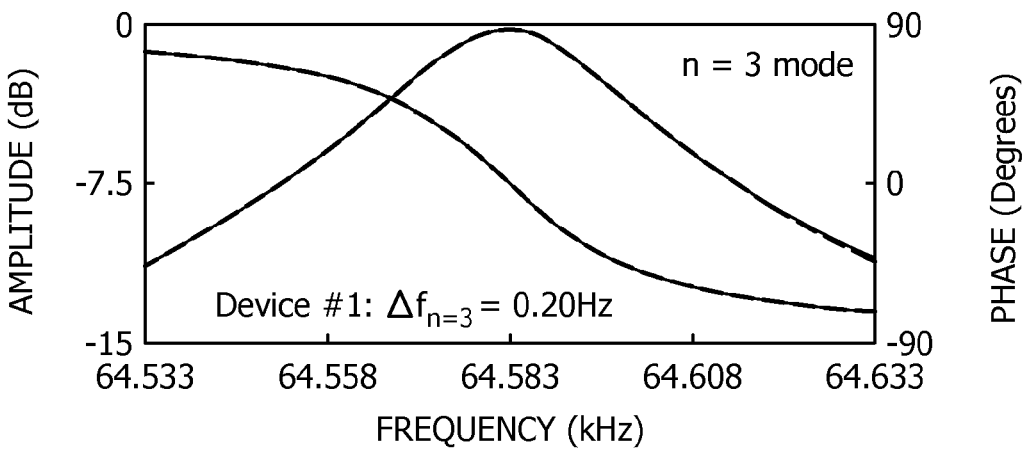

For the first device, center frequencies of degenerate wineglass modes were identified at 27389 Hz and 64583 Hz for n=2 and n=3 wineglass modes, respectively in FIGS. 6a and 6b. Frequency splits between the two degenerate modes were measured by fitting a second order system response onto the frequency sweep data of each degenerate wineglass mode. For the device #1 highlighted in these measurements, frequency split ($\Delta f$) of 0.15 Hz and 0.2 Hz were observed for n=2 and n=3 wineglass modes with 95% confidence levels at 0.23 Hz for n=2 and 0.3 Hz for n=3, FIGS. 6a, 6b. In order to estimate the contribution of electrostatic spring softening effect, DC bias voltage was varied between 20 V-100 V, frequency split stayed below 1 Hz for both modes, attributing the low frequency split to high structural symmetry and not to capacitive tuning as illustrated in FIG. 7.

Figure 8:
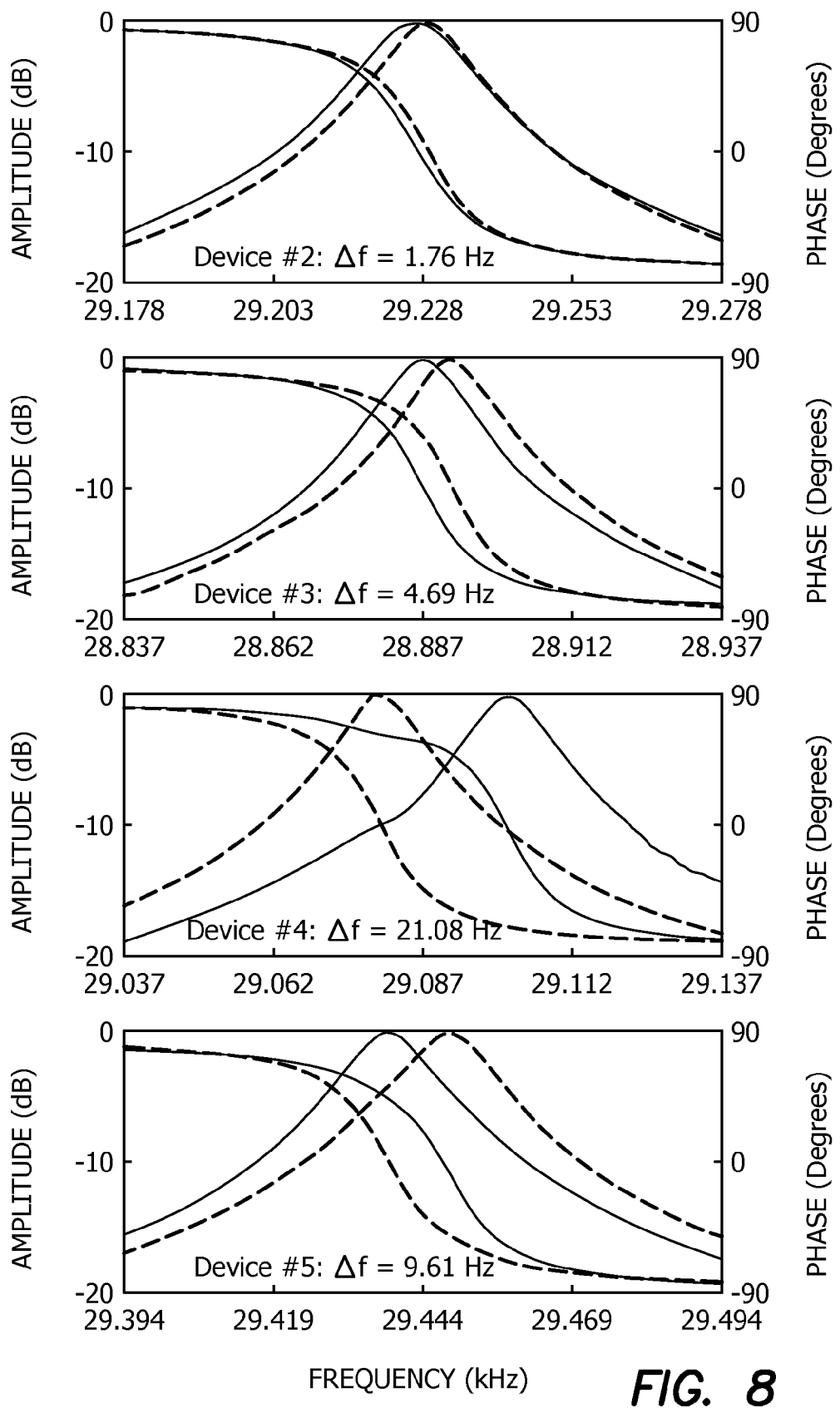
FIG. 8 is a series of graphs of amplitude of vibration of four additional mushroom or wineglass resonator elements as a function of frequency and illustrating the frequency splits of the center frequency between the examples.

In order to verify the repeatability of the results, four other wineglass resonators 10 were characterized using the same method described above. Three of the five wineglass resonators had frequency split less than 5 Hz, one less than 10 Hz for the n=2 wineglass mode, with one outlier at $\Delta f \approx 21$ Hz as shown in FIG. 8.

In conclusion we have thus illustrated a method of fabricating micro-glassblown resonators 10 with integrated electrode structures 32. Electrostatic excitation of micro-glassblown resonators 10 using integrated electrode structures 32 were thus here experimentally demonstrated for the first time. Integrated electrode structures 32 within the glass device layer 18 eliminate the need for additional assembly steps and misalignment errors between the resonator shell 24 and the electrodes 32. In addition by using the same material for the resonator shell 24 and the electrodes 32, thermal stress effects due to thermal expansion mismatch are reduced.

Identification of the mode shapes using laser Doppler vibrometry 34 revealed frequency splits as low as <1 Hz at ~27 kHz center frequency on the first device, giving a relative frequency split of $\Delta f n=2/f n=2 <10$ ppm (or 0.001%). Frequency symmetries slightly over 1 Hz (<5 Hz), Table 1.

TABLE 1

Table summarizing frequency splits and center frequency of 5 different micro-wineglass structures.

| Device # | Center Freq. (Hz) | $\Delta f$ (Hz) | $\sigma$ (Hz) | $\Delta f/f$ (ppm) |
|---|---|---|---|---|
| 1 | 27388.65 | 0.16 | 0.04 | 5.67 |
| 2 | 28889.18 | 4.69 | 0.05 | 162.18 |
| 3 | 29227.60 | 1.76 | 0.05 | 60.30 |
| 4 | 29090.38 | 21.08 | 0.06 | 724.65 |
| 5 | 29442.98 | 9.61 | 0.07 | 326.40 |

These results demonstrate the feasibility of surface tension driven micro-glassblowing process as a means to fabricate extremely symmetric and smooth three dimensional wineglass resonators 10. High structural symmetry ($\Delta f$<1

Hz) and atomically smooth surfaces (0.23 nm Se) of the resonators may enable new classes of high performance three dimensional MEMS devices, such as rate-integrating MEMS gyroscopes and mode-matched angular rate gyroscopes.

Figure 10:
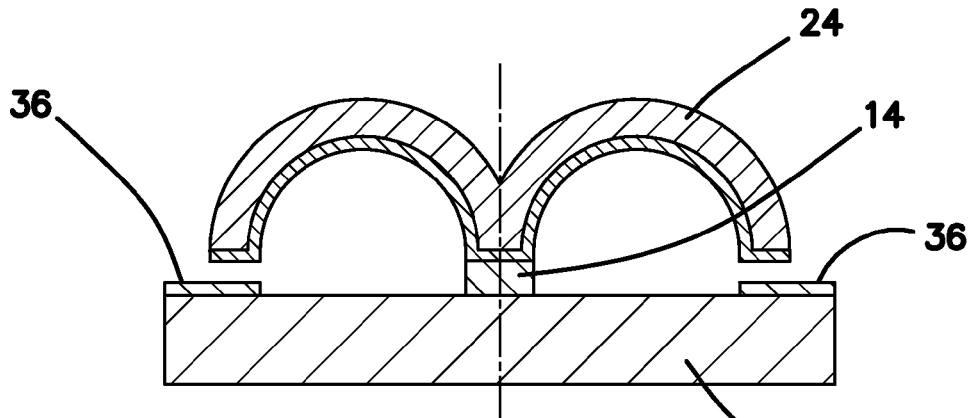
FIG. 10 is a side cross sectional view diagram of an embodiment of the mushroom resonator element configured with out-of-plane electrodes.
Figure 9:
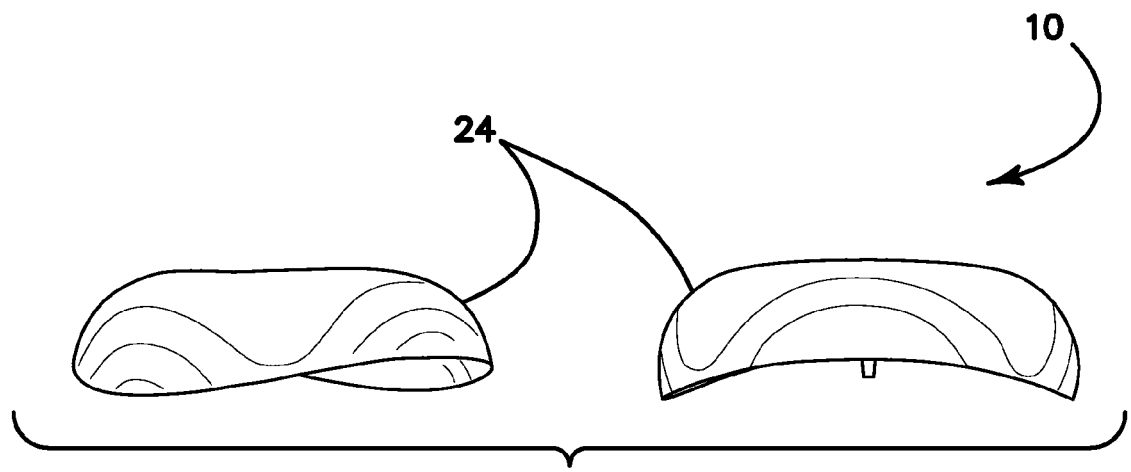
FIG. 9 is a three dimensional depiction in exaggerated form showing the out-of-plane vibration of the mushroom resonator element.

Consider now the fabrication of micro-glassblown wineglass gyroscope with out of plane electrodes. An alternative transduction scheme is out of plane electrodes. This kind of electrode architecture utilizes the three dimensional motion of the shell structure 24. Radial motion along the wineglass perimeter 20 has an out of plane component depicted in FIG. 9. Because of this fact, forcer/pickoff electrodes 36 that operate on the z-axis of the gyro can be utilized to drive/sense the wineglass modes as depicted in FIG. 10. One embodiment of this type of electrode architecture has been demonstrated previously on macro-scale HRGs in a non-wafer level process. The disadvantage of this type of electrode structure is smaller electrode surface area due to the fact that it only encompasses the perimeter 20 of the wineglass structure 24. However this disadvantage is offset by the fact that the electrodes 36 are placed on a planar surface, as a result significantly smaller capacitive gaps are possible. Other advantages include lower cost, robustness to alignment errors and the compatibility with batch-scale fabrication.

Efficiency of transduction of electrostatic pick-off is directly proportional to vibrational velocity and in turn to maximum displacement. For this reason it is important to have large enough displacement across the capacitive gaps as to fully utilize the available gap.

In order to analyze the reduction in maximum displacement going from radial electrodes to out of plane electrodes 36 finite element analysis (FEA) was performed on inverted wineglass structures 24. The FEA consisted of fused silcia inverted wineglass structures 24 with 4 mm diameter and various thicknesses, Table 2.

| Wineglass mode | 50 µm | 100 µm | 150 µm |
|---|---|---|---|
| n = 2 | 85% | 92% | 98% |
| n = 3 | 58% | 66% | 74% |
| n = 4 | 46% | 55% | 63% |

It was found that for the first (and most commonly used) n=2 wineglass mode almost no loss in vibration amplitude occurs. For example n=2 mode of a 50 µm thick wineglass structure only shows a 15% reduction in vibration amplitude (ratio of out of plane displacement to radial displacement is 85%). Increasing the shell thickness to 150 µm increases the efficiency further, up to 98%, which means that for all practical purposes out of plane displacement and radial displacement has the same amplitude.

The fabrication process of the fused silica inverted wineglass structures 24 and out of planes structures is shown in FIGS. 11a-11e. The process flow as designed with wafer-level fabrication and scalability in mind. For this reason only MEMS equipment and MEMS processes were used in the fabrication process such as lithography, wet etching, dry etching, plasma assisted fusion bonding, micro-glassblowing in a rapid thermal annealing furnace, sputtering, wafer to wafer alignment and bonding.

Another advantage of this fabrication process is that both the wineglass shell structure 24 and the electrodes 36 are made out of fused silica. Using same material for the electrodes and the resonator guarantees thermal expansion (CTE) match. Uniform material within the gyro and electrodes is required to suppress thermal drift effects on the gyro caused by contraction, expansion and warping of the gyro due to CTE mismatch.

Figure 11A:
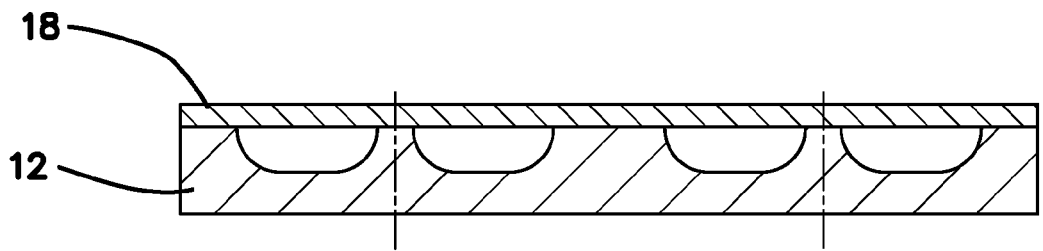
FIGS. 11a-11e is a series of side cross sectional view diagrams illustrating the method of fabrication of the mushroom resonator element configured with out-of-plane electrodes of FIG. 10.

The fabrication process starts with defining a etch mask for the bottom substrate fused silica wafer as shown in FIG. 11a. Typically LPCVD PolySi deposition onto fused silica wafers 12 and patterning of the PolySi layer through lithography/RIE. In the first step of the fabrication, we deposit 3.2 µm poly-Silicon layer on the substrate fused silica wafer. This poly-Si layer will be used for etch mask for wet etching. The poly-Si layer is patterned using DRIE etching on STS etcher. To be able to do DRIE we use photoresist mask. A photoresist of AZ4620 is spin coated in two steps 500 rmp for 10 sec followed by 5000 rpm for 40 sec to define the lithography on the poly-Si layer. The next step in the fabrication process is cavity etch on fused silica 12. We use 300 ml of 49% HF is used to wet etch the cavities. The etch rate we developed was around 1.07 µm/min. The etching was timed and back and forth etching and profile scanning was done to be able to time the etching to get 200 µm depths excluding the masking layer. Patterned PolySi layer is used to mask the wafer for the subsequent etching step. The etching step defines the hemi-toroidal cavities on the bottom substrate layer 12. A typical etching step is using 49% HF to etch hemi-toroidal cavities into the fused silica wafers to a depth of 200 µm resulting in the cavity structure shown in FIG. 11(a).

The next step in the fabrication process is the remove the poly-Si layer sing KOH etch and perform a full cleaning so that the wafer is ready for plasma bonding. Plasma activated fusion bonding works by creating hydrogen bonds between the device and the substrate wafers 12, it requires highly polished, flat, clean surfaces. The process for bonding fused quartz or TSG wafer pairs 18 can be divided into four main steps: Cleaning of the wafer pair using solvent and RCA clean, plasma activation using oxygen plasma of 50 W power for 2 min, with 24 sccm oxygen flow, DI water rinse followed by nitrogen dry and optical contacting of the activated surfaces, and finally curing the wafer stack at 400 C for 6 hours.

Figure 11B:
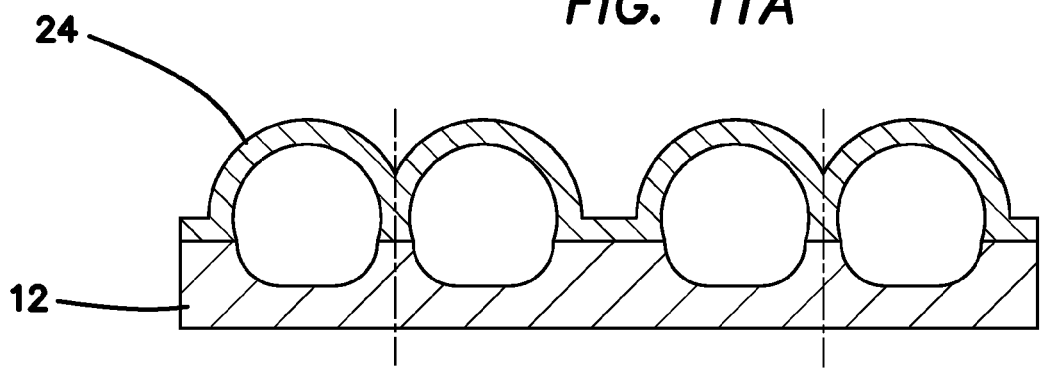

Following the plasma bonding of glass layer 18, the next step of the fabrication process is micro-glassblowing the device layer at 1700° C. resulting in the configuration of FIG. 11(b). This step creates the wineglass shell structures.

Figure 12:
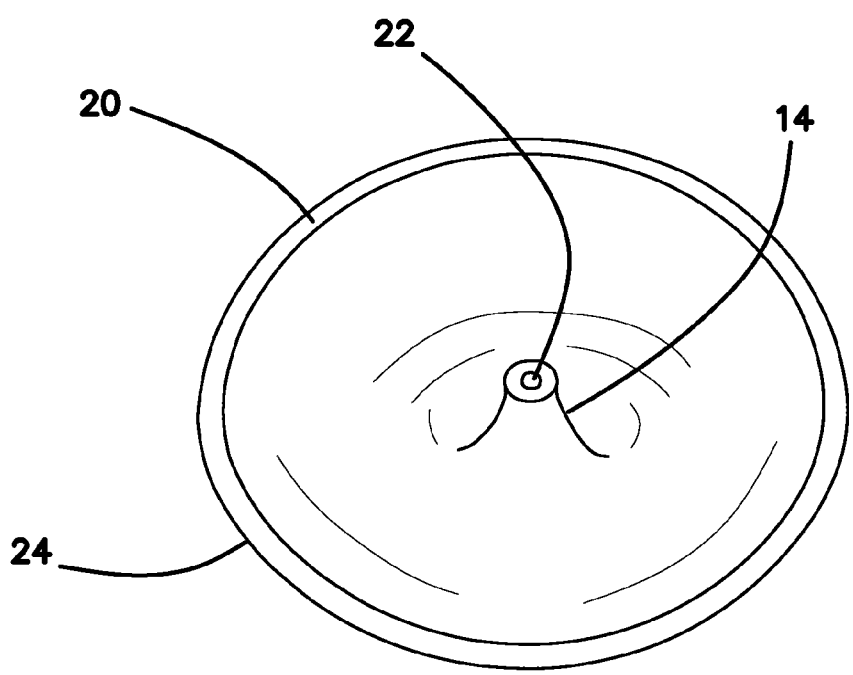
FIG. 12 is a microphotograph of the mushroom resonator element which has been inverted to show its inner or underside.
Figure 11C:
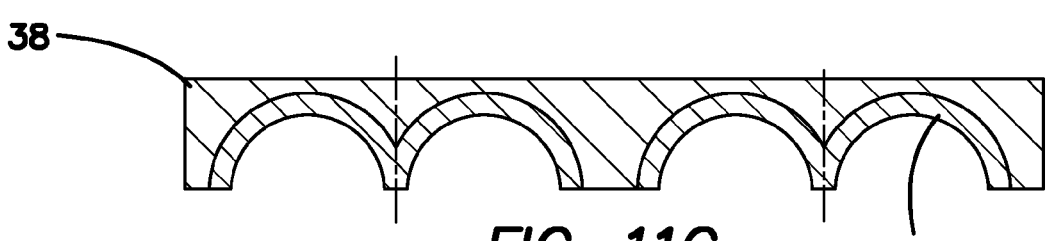
Figure 11D:
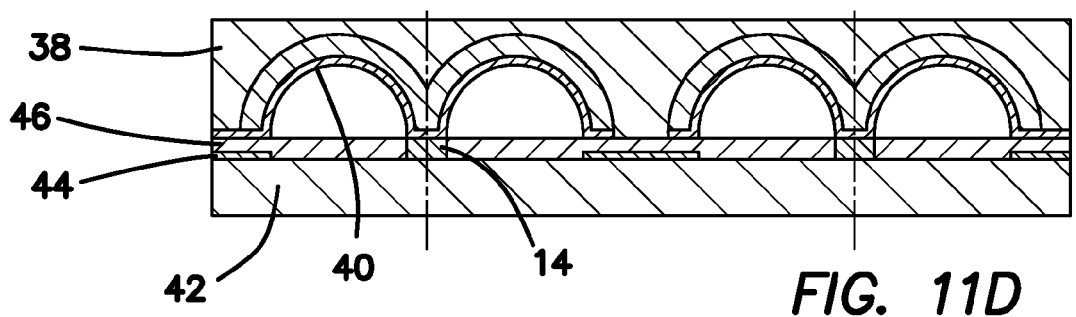
Figure 11E:
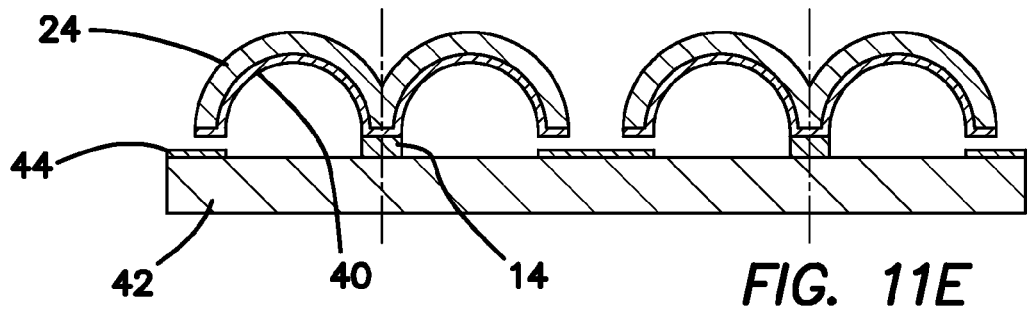

The next step in the fabrication process is releasing the structures. One typical releasing step is embedding the wafer stack in wax 38 and back-lapping the wafer stack as to release the inverted wineglass structures. During this step all of the substrate layer 12 as well as part of the device layer 24 is removed as shown in FIG. 11(c). Once the lapping is complete interior of the inverted wineglass structure is metalized as shown in FIG. 11d. Typically sputtering of Au or Ir is used at this step as to con-formally coat the interior of the structures 24 with metallization layer 40 shown best in FIG. 12.

For the out of plane electrode structures, fused silica wafers 42 of 500 µm thick were coated with a Cr/Au (chrome/gold) 44 metal evaporation. Typically electrode features 44 are defined using lithography and etch-back, although a lift-off process is also viable. Later on a thin sacrificial layer 46 is patterned on top of the electrodes 44 in order to create the capacitive gaps. Lapped and metalized wineglass structures 24 are bonded to the out of plane electrode wafer 42 using Indium or epoxy bonding as depicted in FIG. 11(d). The bonding is performed only at the stem 14 of the inverted wineglass structures 24. Once the bonding is complete the sacrificial layer 46 is removed (PolySi) to release the inverted wineglass structure 24 around its perimeter 20, creating capacitive gaps between the metalized layer 40 on inverted wineglass structure 24 and the Cr/Au electrodes 44.

Figure 13:
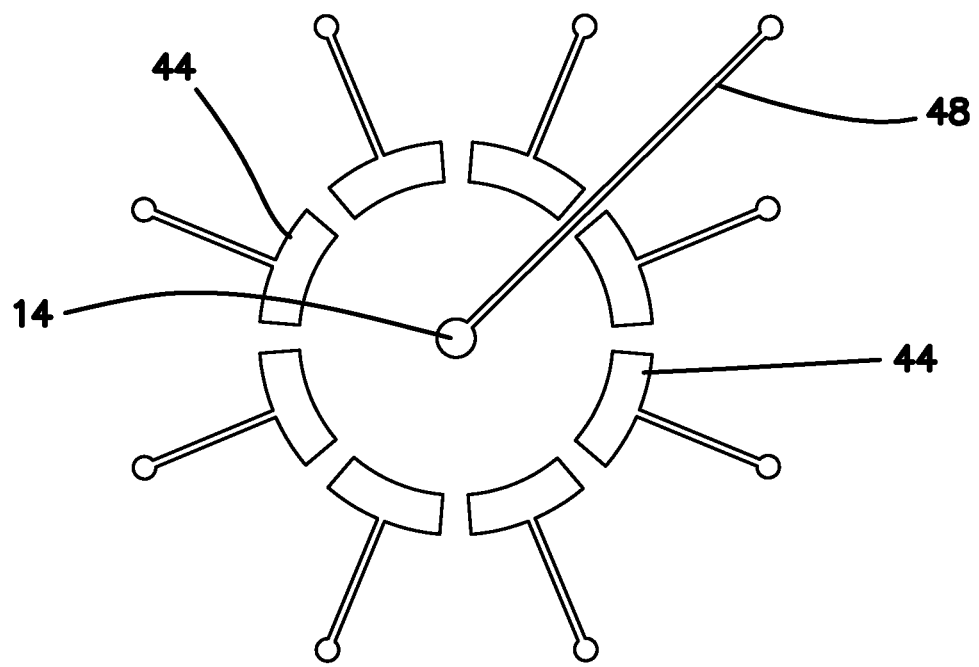
FIG. 13 is a diagram of an electrode pattern of one embodiment of the out-of-plane electrodes.
Figure 14:
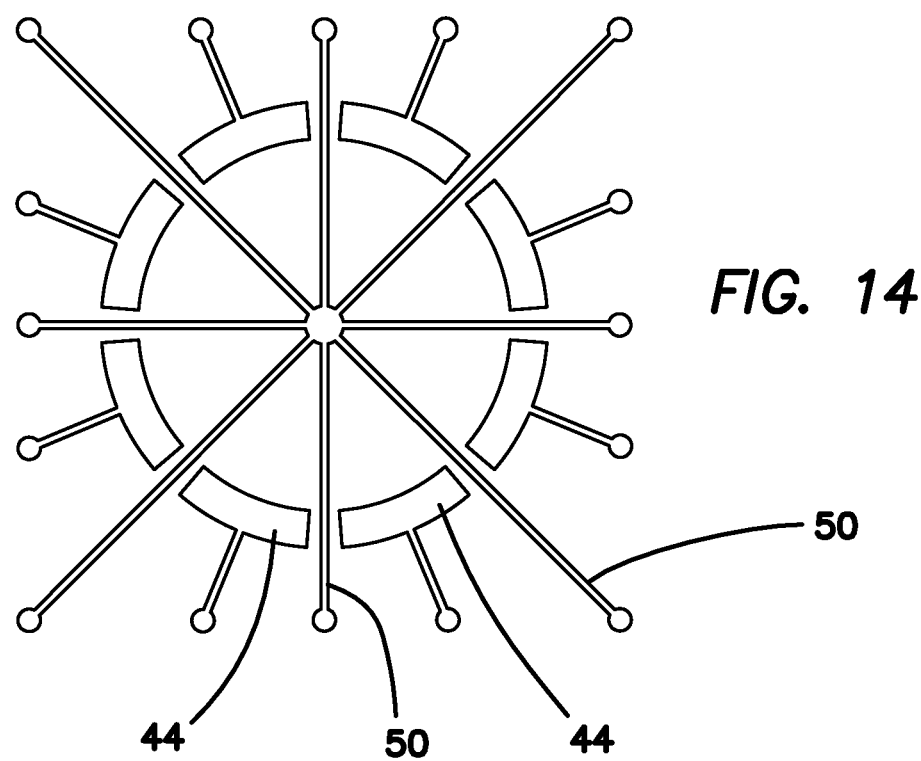
FIG. 14 is a diagram of an electrode pattern of another embodiment of the out-of-plane electrodes in which Faraday isolators are included between electrodes.

Out of plane electrodes are fabricated on fused silica wafers using 100 nm Cr and 300 nm Au layer 44. Patterning is done using lithography and etch-back. The electrodes 44 are laid out in a radial pattern as to fit underneath the perimeter of the inverted wineglass structures 24 with a central electrode connection 48 as diagrammed in FIG. 13. Aside from the radial electrodes, Faraday planes or resonator bias lines 50 were also integrated into the design to reduce capacitive cross-talk between electrode pairs 44 in FIG. 14. This kind of electrode configuration targets the n=2 wineglass mode, although a 12, 24 or 32 electrode configuration can easily be used for higher order (n=3, n=4 etc), wineglass modes. The key point of this fabrication process and electrode configuration is that it is compatible with wafer level batch fabrication.

Figure 15:
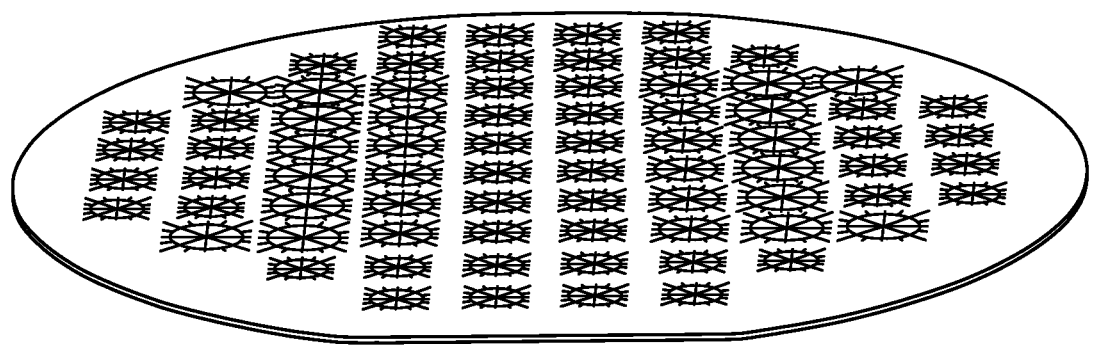
FIG. 15 is a photograph showing the product or finished wafer resulting from the wafer level batch process of the illustrated embodiments.
Figure 16:
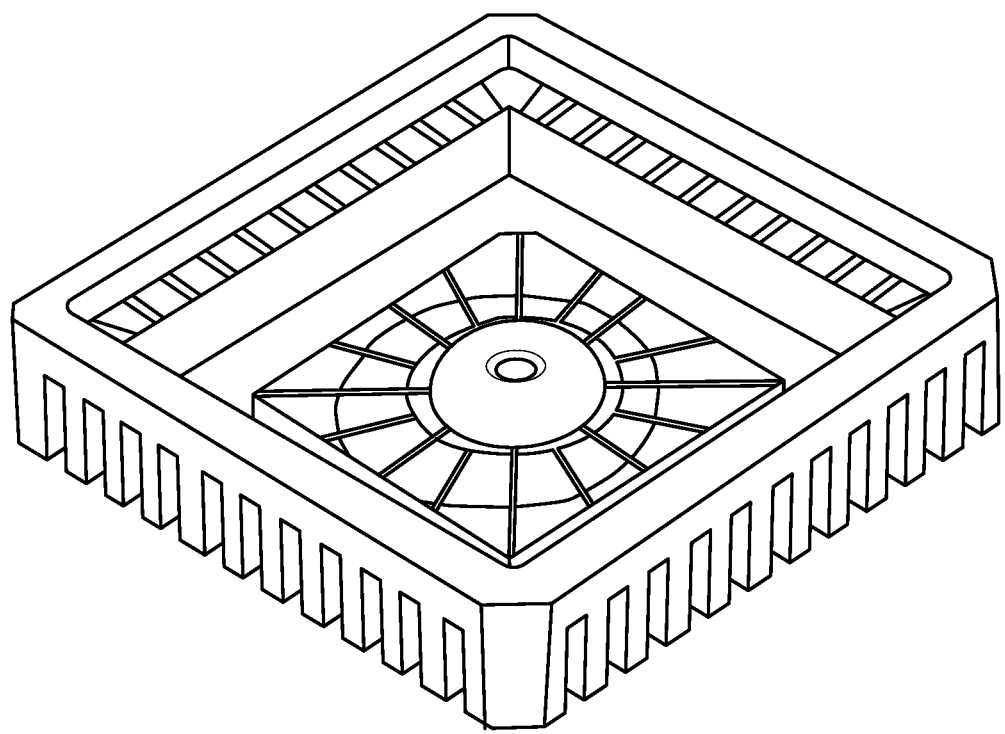
FIG. 16 is a microphotograph of a mushroom resonator element with its electrode structure mounted in a wire bonded chip carrier.
Figure 17:
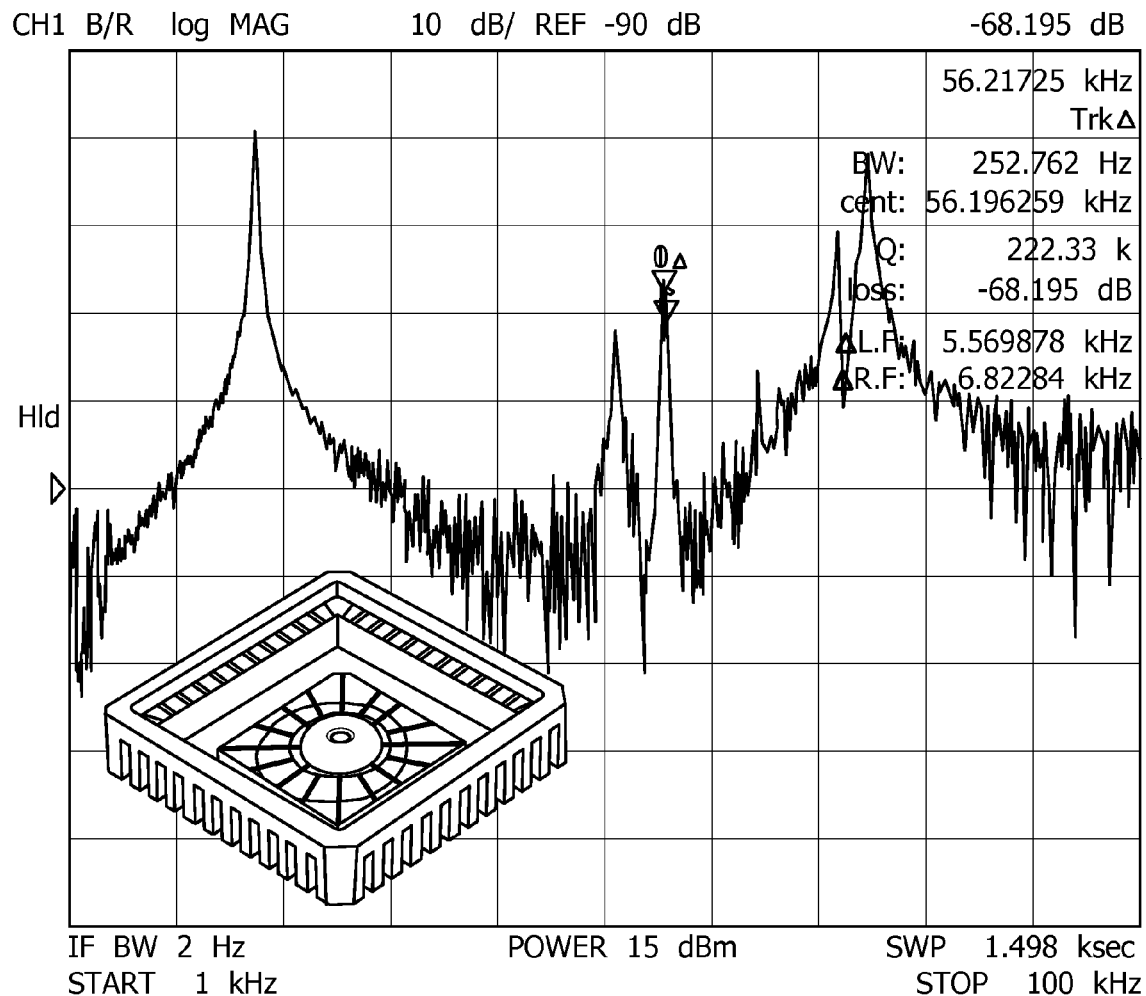
FIG. 17 is a graph of the embodiment of FIG. 16 as a function of frequency.
Figure 18:
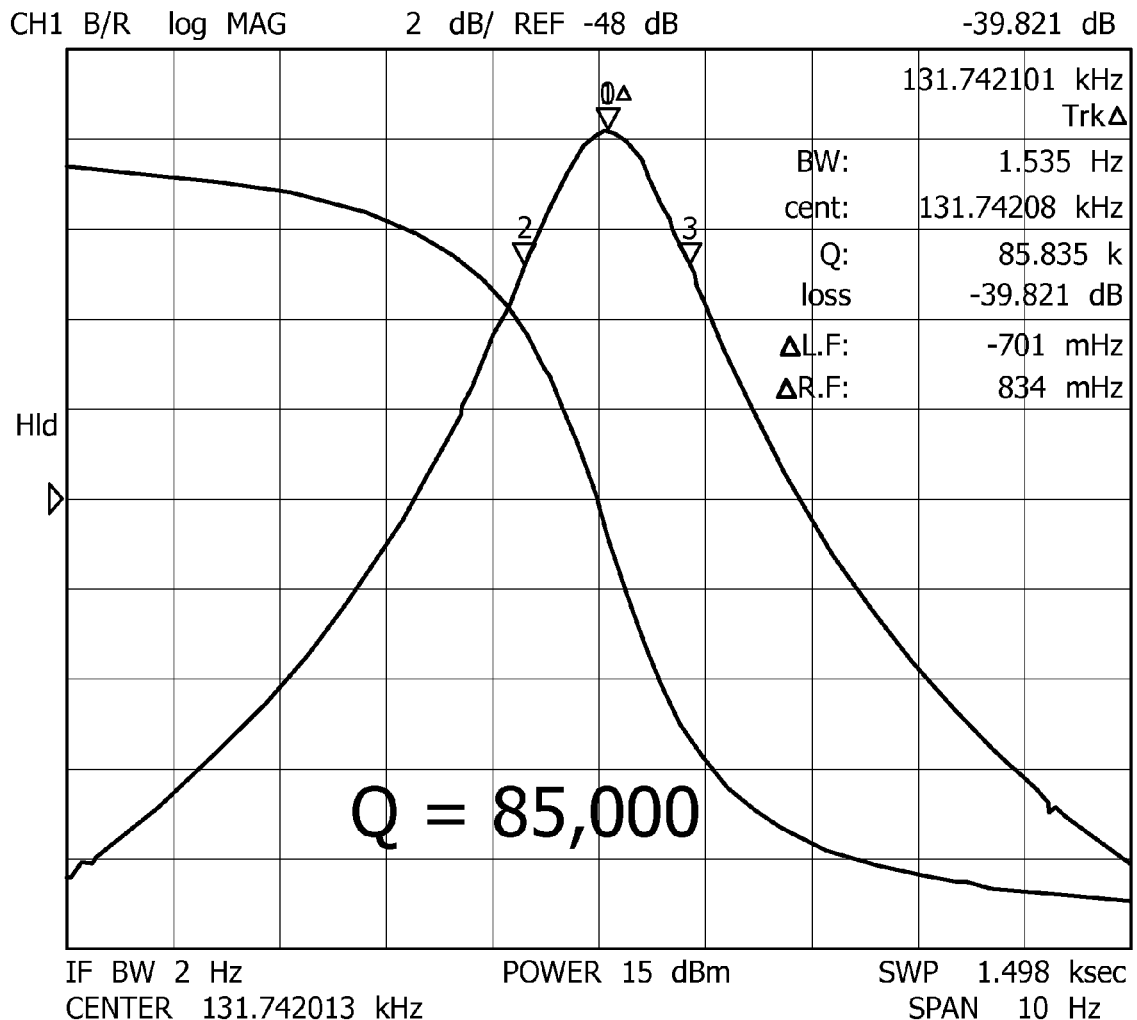
FIG. 18 is a graph of the embodiment FIG. 16 illustrating the Q factor of the device.

Experimental Result 3.8 mm fused silica inverted wineglass structures with out of plane electrodes 40, 44 were fabricated on a wafer level batch fabrication as depicted in the photograph of FIG. 15. The devices were later packaged into ceramic leadless chip carriers (LCCs) and wire bonded as shown in the photograph of FIG. 16. Preliminary experiments show Q-factors of 85 k for fused silica inverted-wineglass structures in FIGS. 17 and 18. To the best of our knowledge this is the highest Q-factor observed for a MEMS wineglass gyroscope at this diameter. It is believed that the Q-factor can be further improved by the improving surface roughness of the lapped surfaces and internal stress build up within the material. The surface roughness around the perimeter 20 of the wineglass structure 24 can easily be reduced by further polishing of the perimeter 20 of the inverted-wineglass structure 24 by using smaller grit size diamond abrasive film and through the use of colloidal suspensions, whereas the internal stress build-up can be reduced through annealing.

The invention is further illustrated in the disclosure of the Appendix incorporated and filed herewith.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

We claim:

1. A method of making a Coriolis vibratory gyroscope with a three dimensional mushroom resonator element comprising:
    defining a cavity in a substrate wafer;
    bonding a cap wafer onto the substrate over the cavity from which cap wafer the mushroom resonator element will be formed;
    heating the substrate and cap wafer to generate a pressure build-up within the cavity;
    plastically deforming the cap wafer by the pressure build-up to form the mushroom resonator element having a perimeter around the mushroom resonator element;
    releasing the three dimensional mushroom resonator element at the perimeter by selectively removing material so that the perimeter of mushroom resonator element is free to vibrate; and
    disposing a layer of conductive material on the mushroom resonator element to form electrodes thereon for use in driving and sensing vibrations of the mushroom resonator element and its perimeter.

2. The method of claim 1 where releasing the three dimensional mushroom resonator element comprises etching a circular trench into the substrate wafer underneath the perimeter of the resonator element to release the three dimensional mushroom resonator at the perimeter.

3. The method of claim 2 where etching the circular trench comprises etching the circular trench when cap wafer is still planar before plastically deforming the cap wafer into the three dimensional mushroom resonator element.

4. The method of claim 2 where etching the circular trench comprises etching the circular trench is etched after plastically deforming the cap wafer into the three dimensional mushroom resonator element.

5. The method of claim 1, where the substrate wafer has a backside opposing the mushroom resonator element and where releasing the three dimensional mushroom resonator element comprises releasing the three dimensional mushroom resonator element at the perimeter by lapping the substrate wafer from the backside.

6. The method of claim 1, where releasing the three dimensional mushroom resonator element comprises releasing the three dimensional mushroom resonator element at the perimeter by plasma etching.

7. The method of claim 1, where releasing the three dimensional mushroom resonator element comprises releasing the three dimensional mushroom resonator element at the perimeter by wet chemical etching.

8. The method of claim 1, where releasing the three dimensional mushroom resonator element comprises releasing the three dimensional mushroom resonator element at the perimeter by dry chemical etching.

9. The method of claim 1, here releasing the three dimensional mushroom resonator element comprises releasing the three dimensional mushroom resonator element at the perimeter by ultrasonic machining.

10. The method of claim 1, where releasing the three dimensional mushroom resonator element comprises releasing the three dimensional mushroom resonator element at the perimeter by abrasive jet machining.

11. The method of claim 1, where releasing the three dimensional mushroom resonator element comprises releasing the three dimensional mushroom resonator element at the perimeter by milling.

12. The method of claim 1, where releasing the three dimensional mushroom resonator element comprises releasing the three dimensional mushroom resonator element at the perimeter by directional plasma etching along the perimeter followed by isotropic dry etching of the substrate wafer underneath the perimeter.

13. The method of claim 1 where disposing the layer of conductive material on the mushroom resonator element to form electrodes thereon comprises forming out-of-plane electrodes for electrostatic transduction by removing the substrate wafer, disposing conductive electrodes on a base wafer, disposing a sacrificial layer on the conductive electrodes and base wafer, bonding the sacrificial layer with the released mushroom resonator element, and removing the sacrificial layer to create an out of plane capacitive gap between the mushroom resonator element and the conductive electrodes on the base wafer.

14. The method of claim 13 where disposing conductive electrodes on a base wafer comprises blanket disposing a conductive layer onto the base wafer and selectively removing portions of the conductive layer to define electrodes.

15. The method of claim 13 where disposing conductive electrodes on a base wafer comprises disposing doped silicon, diamond or metal.

16. The method of claim 13 where disposing a sacrificial layer on the conductive electrodes and base wafer comprises disposing a sacrificial layer of a selected thickness to define the distance of the out of plane capacitive gap.

17. The method of claim 13 where disposing a sacrificial layer on the conductive electrodes and base wafer comprises the disposing a shim between the mushroom resonator element and the electrode on the base wafer, bonding the base wafer to the mushroom resonator element, and removing the shim.

18. The method of claim 1, where disposing a layer of conductive material on the mushroom resonator element comprises forming in-plane electrodes for electrostatic transduction by selectively removing portions of the substrate wager at the perimeter of the three dimensional mushroom element and between individual electrodes to define a capacitive gap.

19. The method of claim 18 where forming in-plane electrodes for electrostatic transduction the capacitive gaps for individual electrodes comprises forming the in-plane electrodes before plastically deforming the cap wafer, then releasing the three dimensional mushroom resonator element at the perimeter.

20. The method of claim 18 where disposing a layer of conductive material on the mushroom resonator element to form electrodes is performed after plastically deforming the cap wafer by the pressure build-up to form the mushroom resonator element.

21. The method of claim 1 where disposing a layer of conductive material the mushroom resonator element to form electrodes comprises forming a plurality of flat electrodes underneath the perimeter of the three dimensional mushroom resonator element to define out of plane capacitive gaps.

22. The method of claim 1 where disposing a layer of conductive material on the mushroom resonator element to form electrodes comprises forming a plurality of radial electrodes underneath the perimeter of the three dimensional mushroom resonator element to define in-plane capacitive gaps.

* * * * *